United States Patent [19]
Morgan et al.

[11] 3,874,124
[45] Apr. 1, 1975

[54] METHOD AND APPARATUS FOR MACHINING AND/OR POLISHING MOLDED ELASTOMER MATERIALS

[76] Inventors: Harry C. Morgan, 5821 Darlington Rd., Apt. 4, Pittsburgh, Pa. 15217; Walter W. Weis, Jr., 226 Comrie Ave., Braddock, Pa. 15104

[22] Filed: Mar. 21, 1974

[21] Appl. No.: 453,407

Related U.S. Application Data

[63] Continuation-in-part of Ser. No. 334,025, Feb. 20, 1973, abandoned.

[52] U.S. Cl. ............... 51/125, 51/162, 51/216 LP, 51/267, 51/284, 51/322, 51/324, 269/7
[51] Int. Cl. ..................... B24b 13/02, B24b 1/00
[58] Field of Search ............ 51/284, 322, 324, 131, 51/356, 216 LP, 267, 266, 125, 129, 162; 269/7

[56] References Cited
UNITED STATES PATENTS

| | | | |
|---|---|---|---|
| 3,077,707 | 2/1963 | Sarofeen | 51/284 |
| 3,333,369 | 8/1967 | Barr | 51/277 |
| 3,475,867 | 11/1969 | Walsh | 51/277 X |
| 3,574,257 | 4/1971 | DuBois | 269/7 |
| 3,686,796 | 8/1972 | Clark | 51/284 X |
| 3,750,272 | 8/1973 | Gomond | 51/284 X |

FOREIGN PATENTS OR APPLICATIONS

| | | | |
|---|---|---|---|
| 963,407 | 7/1964 | United Kingdom | 51/324 |

*Primary Examiner*—Donald G. Kelly
*Attorney, Agent, or Firm*—Brown, Murray, Flick & Peckham

[57] ABSTRACT

A method of and apparatus for machining and/or polishing contact lenses of the type produced in a semifinished form by molding of silicon rubber elastomer materials such as hydrocarbon substituted polysiloxane rubber. After selecting a semifinished lens, a layer of liquid, e.g. water, is applied to the lens and/or a holder. The lens support surface on the holder is preferably flat but may be either convex or concave. When the holder has a flat surface, pressure is applied to the lens to flatten it and expel entrapped air. The lens is then centered on the holder. A stream of coolant is preferably directed onto the holder to reduce the temperature of the lens material. This cooling freezes the liquid layer thereby affixing the lens to the holder. The cooling also hardens the elastomer material of the lens. At a reduced temperature of −90°F or less, the lens material becomes sufficiently hardened so that polishing and/or machining of a selected surface can be effected by contact with a tooling member having a liquid interface on the tooling surface. The preferred composition of the liquid interface is oil of orange and ethanol with the further addition of stannic oxide as a polishing agent. The lens is rotated by the holder or alternatively the tooling member is rotated during machining and/or polishing. Following this, the lens is allowed to return to ambient temperature. The present invention further provides improved apparatus including different forms of support members with flat, convex or concave lens support surfaces. The support members include improved provision for centering of the lens on the support member. A spring-biased plunger is used to hold the lens onto the support member after centering. Additionally, machining tools for the lens are provided with segments of either a convex or concave tooling surface.

51 Claims, 8 Drawing Figures

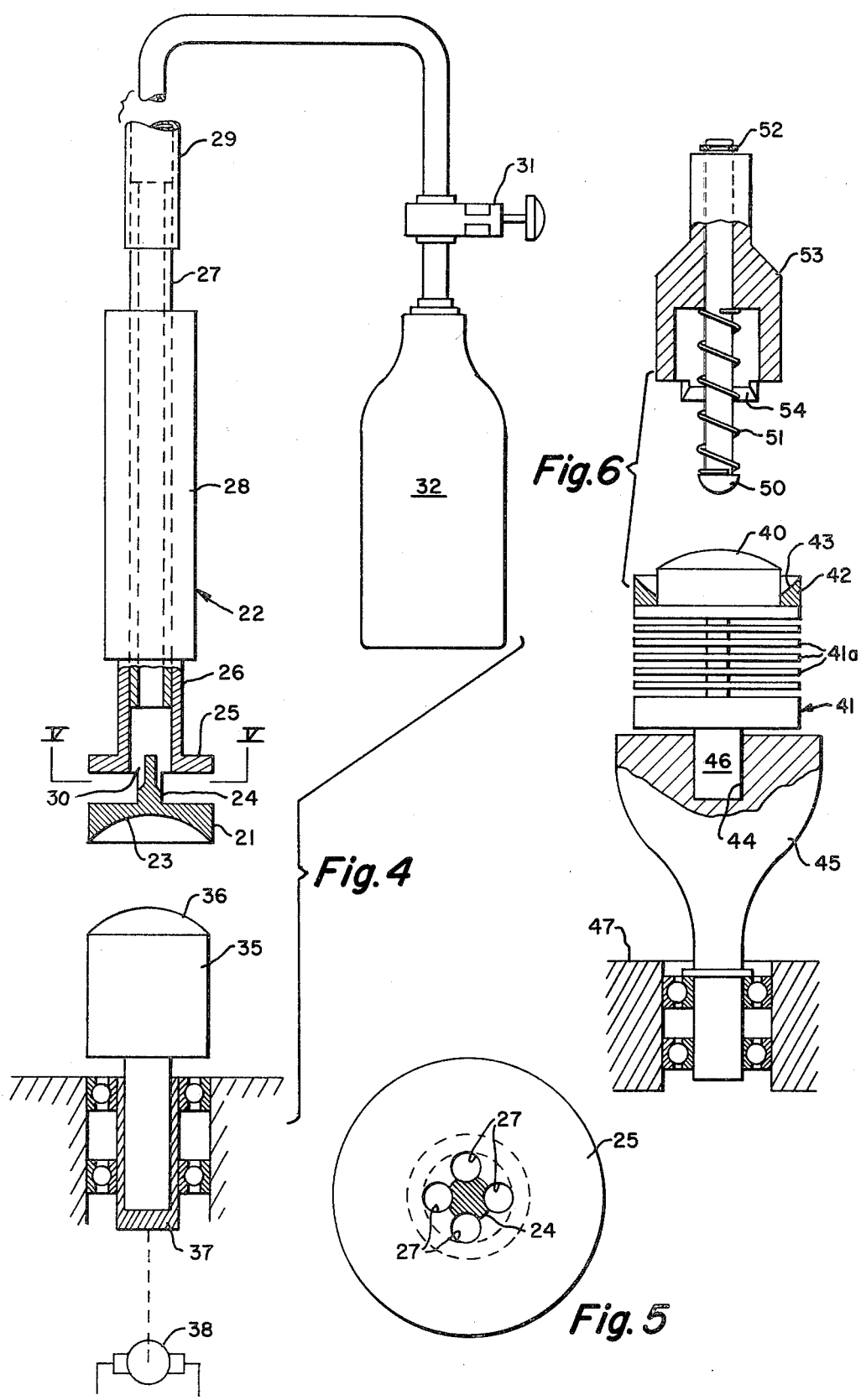

METHOD AND APPARATUS FOR MACHINING AND/OR POLISHING MOLDED ELASTOMER MATERIALS

CROSS REFERENCE TO RELATED APPLICATION

This application is a continuation-in-part of application Ser. No. 334,025 filed Feb. 20, 1973, and now abandoned.

BACKGROUND OF THE INVENTION

The present invention relates to a method and apparatus for producing a predetermined and desired peripheral curve in either or both of the peripheral posterior curve area and the peripheral anterior curve area of a contact lens. The present invention is particularly adapted for modifying a semi-finished contact lens in the form of a molded elastomer material, particularly molded hydrocarbon substituted polysiloxane rubber material.

It is well accepted knowledge that the cornea portion of the human eye is not a simple spherical surface having a single radius of curvature but instead, the cornea is a complex physiological interface consisting of many curvatures and may have an irregular or warped surface.

The selection of contact lenses typically requires measurements of the anterior radius of the cornea to determine the base curve of posterior radius of contact lenses, the diameter of the cornea, the size of the palpebral fissure area, and the required corrective power property of the lens. In order to supply properly fitted contact lenses, the specified semifinished lens must be provided with usually custom-formed posterior and anterior lens surface. In the past, contact lens blanks formed from materials such as clear methyl methacrylate, ethyl acrylate, or copolymers of methyl and ethyl acrylate were prefinished in a manner to necessitate only minor changes during a fitting process. A lens made from these materials is usually referred to as a "hard" contact lens and could be modified by machining and/or polishing without great difficulty.

The peripheral curve areas of contact lenses are extremely important to successful use and comfort to the ultimate user of the contact lenses. The peripheral anterior curve area of the lens surface defines a surface over which the eyelid first passes during its travel in the downward direction. The transitional movement by the lid onto the lens must occur without the tendency to "dig in" and without hampering easy movement of the lid over the lens. The peripheral posterior curve of the lens constitutes a surface that defines somewhat of a reservoir for the tear fluid which passes from the reservoir into the interior area encompassed between the lens and the cornea portion of the eye. The contour of this surface is important to a continuous flow of tear fluid in a manner without a stagnation of fluid between the lens and the eye.

The foregoing discussion was principally directed toward the older and prior art practice of fitting "hard" contact lenses. Much of this procedure is equally applicable to the supplying and fitting processes for lenses made from a molded elastomer, particularly hydrocarbon substituted polysiloxane rubber lens material. Typically, a molded lens of this material has a hardness of 80–85 Shore A Durometer and may include a silica filler whereby the lens has an index of refraction of 1.439 and transmits light at 86% in its dry state and 91% in its wet state. Such lens material for contact lenses is presently available from Dow Corning Company marketed under the trade name of "Dow Corning Silcon Contact Lens."

The elastic nature of these lenses has many desirable attributes including permeability to $CO_2$ and $O_2$ gases. However, the elastomer material is difficult to machine and polish to any substantial extent. Attempts in the past to modify or alter the shape and contour of these lenses after molding have met with unacceptable results. This is believed to stem from the elastic nature of the elastomer material that was impervious to modifications essential to the production of suitably finished surfaces. Surface alteration in the past produced a surface that was very rough, resembling a course machined surface and not translucent. As a result, modifications to the peripheral anterior curve left the lens with a very rough surface which irritated the inner surface of the eyelid as it passed onto the contact lens. Attempts to alter the peripheral posterior curve surface of the lens were essentially impossible to accomplish.

It is an object of the present invention to provide a method and apparatus for the modification of a surface defined by a molded elastomer article to meet specified dimension requirements and/or to meet required surface characteristics.

It is a further object of the present invention to provide a method and apparatus for machining and/or polishing an article, particularly a contact lens, of molded elastomer material which is essentially caused to undergo a substantial reduction to the temperature thereof to produce a temporary hardening of the elastomer material throughout the machining and polishing operations which include the essential maintenance of a liquid interface between a tooling surface and a surface of the article.

It is a still further object of the present invention to provide a method and apparatus for machining and/or polishing an article, particularly a contact lens, of molded elastomer material that is affixed to a support member by freezing a layer of liquid betwween the article and the support member as a necessary incident to reducing the temperature of the elastomer material for the machining and polishing operations.

In accordance with the present invention there is provided a method of machining and/or polishing an article, such as a contact lens or the like, of a molded elastomer to modify a surface of the article, the method includes the steps of: positioning th article upon the support surface of a carrier member; reducing the temperature of the article to essentially increase the hardness of the molded elastomer material thereof; establishing a liquid interface between a tooling surface and a selected surface of the article to undergo modification, the liquid interface being a fluid having a freezing point below the reduced temperature of the article; modifying the selected surface of the article by the contact with a tooling surface in the presence of the liquid interface while maintaining the molded elastomer at a state of increased hardness by the reduced temperature thereof; and thereafter, allowing the temperature of the article to return to an ambient room temperature.

The method according to the present invention includes the steps of: establishing a layer of liquid between a surface of the article and the support surface of a carrier member, the liquid forming this layer having a freezing point at a temperature essentially above a subsequently reduced temperature of said article; and thereafter locating the article into a desired position upon the support surface of a carrier member, the reducing of the temperature of the article being further essential to the freezing of the layer of liquid to thereby affix the article onto the carrier member.

When the carrier member has a flat support surface and the outer peripheral edge of a contact lens is supported thereon, then pressure is exerted on the lens to elastically flatten the molded elastomer lens essentially until all entrapped air is expelled following which the elastically deformed lens is affixed to the carrier member by freezing the aforesaid layer of liquid. In another aspect, the support member may take the form of an aqueous cell having an inclined support surface at the upper end of a tubular wall surrounding a pocket to contain the aforesaid layer of liquid to serve the added functions of centering and leveling a contact lens in an automatic manner.

The method of the present invention is further characterized by forming the aforesaid liquid interface from a liquid mixture preferably including a constituent elements; oil of orange and ethyl alcohol. The liquid mixture may additionally include stannic oxide in powdered form to serve as a polishing agent.

The method according to the present invention may be employed specifically for machining and polishing the peripheral posterior and anterior curves formed or to be formed in a semi-finished contact lens of molded elastomer and particularly a molded silicon rubber contact lens. Additionally, the diameter of said lenses may be reduced, if desired.

The present invention provided improved forms of apparatus for carrying out the aforesaid machining and/or polishing operations, including the combination of; carrier means having a face surface for supporting a contact lens in a manner to expose a surface of the lens during the modification thereof; the carrier means further including a heat exchange surface remote to the face surface to essentially reduce the temperature of the lens while supported by the carrier means through the agency of conductive heat transfer; means to direct a cooling medium onto the heat exchange surface for hardening the lens by reducing the temperature thereof essentially by conductive heat transfer; tooling means including a liquid interface for modifying the exposed surface of the contact lens; and means for producing relative rotation between the tooling means and the contact lens while supported by the carrier means.

The apparatus according to the present invention provides apparatus for carrying out the aforesaid machining and/or polishing operations, including a lens holder having a surface for supporting either the concave or convex surface of the lens during machining and/or polishing operations. The lens holder according to one embodiment for modifying lenses for fitting purposes includes a lens support disk, an elongated tubular handle for the passage of a gaseous or liquid coolant toward the disk, means for securing the disk to the handle, an opening between the passageway in the handle and the disk for cooling the lens by conduction as the coolant strikes the lens holder, a controlled source of liquid or gaseous coolant and conduit including valve means for delivery of the coolant to the handle of the lens holder.

In another form of the present invention there is provided a lens support member having in one form a concave surface and in another form a convex surface for supporting in a desired position a lens to be machined and/or polished, a ring having an inclined leading edge for centering the lens upon the surface of the holder, the ring being constructed to pass over the lens holder whereby after locating the lens on the holder, the lens is centered by displacement of the centering ring into contact with the outer peripheral edge of the lens. In combination with the aforesaid lens support member there may be additionally provided a plunger having a spherical end for contact with the lens, resilient means for maintaining the plunger in holding contact with the lens, and means for supporting the plunger. In the preferred form, the plunger is supported within a central bore provided in a tool member. The tool member includes segmented lengths of an abrasive surface which has either a convex or concave form.

These features and advantages of the present invention as well as others will be more apparent when the following description is read in light of the accompanying drawings, in which:

FIG. 4 is a cross-sectional view of apparatus according to one embodiment of the present invention for machining and polishing moled elastomer contact lenses;

FIG. 5 is an enlarged sectional view taken along the line V—V of FIG. 4;

FIG. 6 is a sectional view illustrating apparatus according to a second embodiment for machining and polishing semifinished, molded elastomer lenses;

Figure 1:
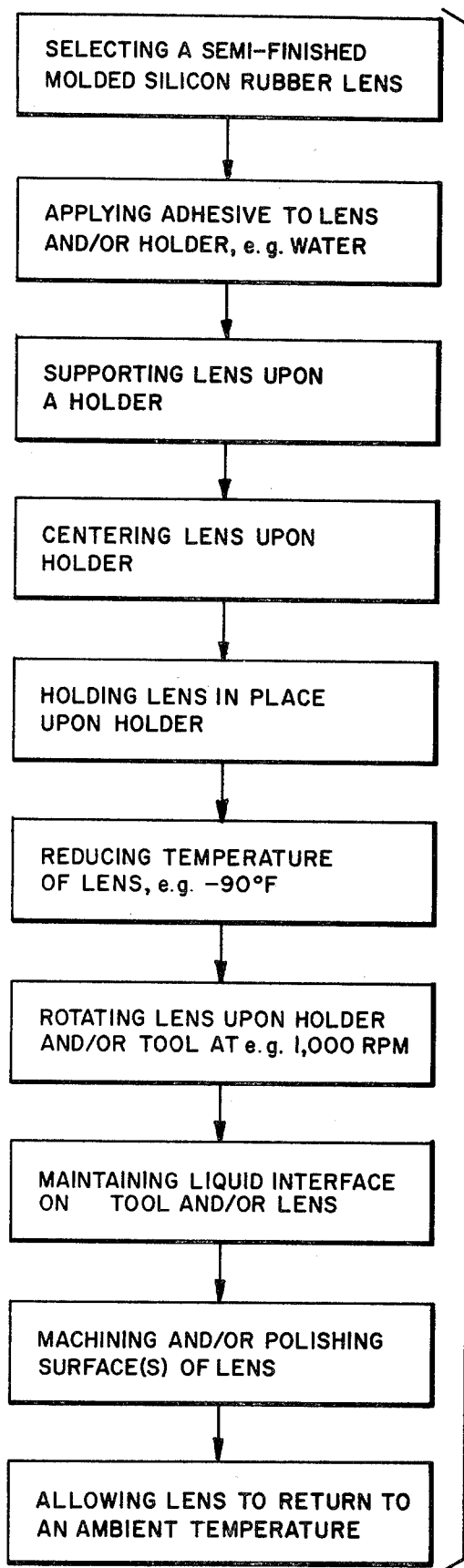
FIG. 1 is a block diagram illustrating the method of polishing and/or machining contact lenses according to the present invention.
Figure 2:
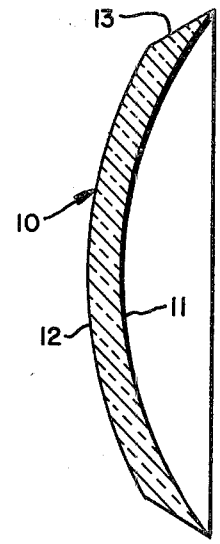
FIG. 2 is a cross-sectional view of a typical semifinished contact lens.

With reference now to FIGS. 1 and 2 of the drawings, the initial step in the method according to the present invention consists of selecting a semifinished contact lens in the form of a molded elastomer particularly, for example, molded silicon rubber material. The semifinished lens is selected on the basis of a desired base curve which is determined by actual measurements of the eye to be fitted with a contact lens. In addition, the selection of the semifinished lens requires measurements to determine the required diameter and optical power of the lens. Usually, incident to the fitting process, the diameter of the lens is reduced slightly, therefore it is the practice to specify a lens diameter slightly exceeding that which is actually needed for the final fitted lens. The shape of the lens in its semi-finished form is illustrated by FIG. 2 where it will be noted the lens 10 has a posterior surface 11 which is intended to be fitted to the cornea of the user's eye. The outer or anterior surface 12 of the lens terminates by a chamfered portion 13. Typically, this chamfered portion when the lens in its semi-finished state is rough, resembling that of a tool finish and has greatly reduced translucent properties over that of the other surfaces of the lens.

Figure 3:
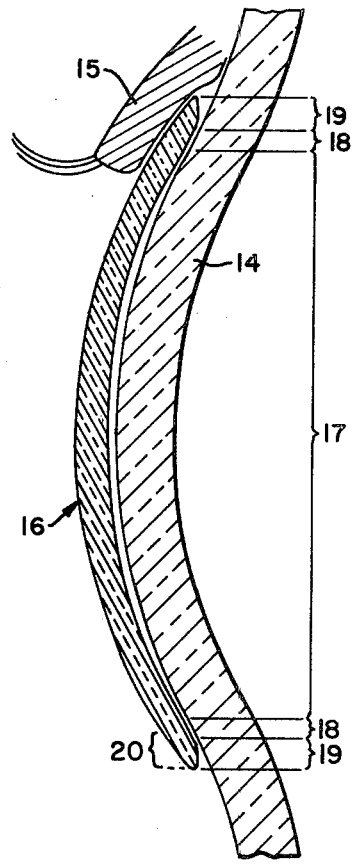
FIG. 3 is a cross-sectional view illustrating the relationship of a fitted contact lens to the cornea of an eye.

After the selection of a semifinished lens such as that illustrated by FIG. 2, the present invention provides a method and apparatus for machining and polishing of the surfaces of the lens. One or more surfaces of the lens can be readily modified to produce the particular shape and configuration necessary for immediate of subsequent proper fitting of the lens to the eye which relationship is typically illustrated by FIG. 3. The cornea of the eye is generally indicated by the reference numeral 14 and the eyelid 15 is shown passing over the upper leading edge of a finished contact lens 16. It is essential to the successful use of corneal contact lenses to provide the lens with a smooth, tapering extremity which allows movement of the lens on the cornea without the tendency to dig-in and impede movement of the lid over the lens. It is clearly apparent that the semifinished lens shown by FIG. 2 requires machining and then polishing in order to obtain a proper fitting relationship with the cornea as illustrated by FIG. 3. It is important that the outer diameter of the lens should be neither excessively sharp or blunt.

The finished lens shown in FIG. 3 typically includes a central posterior curve 17 which terminates into an intermediate posterior curve surface 18 which then blends into a peripheral posterior curve portion 19. At the anterior surface of the lens there is usually defined a peripheral anterior curve portion 20. The present invention is directed to machining and polishing the surfaces 19 and 20 including, when necessary or desirable, the "blending in" of the surface 19 with the surface 18. The diameter of the lens may be reduced, if desired.

After selection of a desired semifinished lens, it is coated with an aqueous solution typically in the form of water (distilled) or other biocompatible solution which is nondestructive to the elastomer material and has a freezing point similar to water, may be employed with successful results. Irrespective of the liquid that is actually employed, the properties of the substance must be such that they will firmly affix the lens to a support surface when the temperature thereof has been reduced below its freezing point. Thus, it is important to establish a layer of liquid between the lens and the support surface of a carrier member. Water is an excellent choice for the liquid, but other liquids having a freezing point of even $-75°F$ are usable.

FIGS. 4 and 6 illustrate two forms of apparatus for supporting the lens. The apparatus illustrated by FIG. 4 is used for manual modifications of the lens while the apparatus illustrated by FIG. 6 may be used in an automated manner in combination with a vertically-arranged lathe or similar machine. In FIG. 4, the lens is supported on a lens support disk 21 of a probe 22. The lens support disk has a concave surface 23 when the surface 13 (FIG. 2) of a lens is to be machined and polished. The surface 23 will be convex in shape when the lens surface 11 is to be machined and polished. The surface 24 can be flat, is desired. The diameter of the disk should be one-half millimeter or less than the diameter of the lens so that adequate lens support is provided throughout the machining and polishing operations.

As shown in FIGS. 4 and 5, the disk is attached by a reduced diameter shaft 24 to a collar 25. The collar is formed integrally with a sleeve portion 26 so that the central opening thereof communicates with a series of holes 30 for providing a gas passageway through the sleeve. The holes 30 direct a cooling medium into impinging contact with the back surface of the disk 21, thus cooling by conduction the support surface 23 for the lens. A length of pipe 27 passes a short distance into the sleeve 26 where it is rigidly attached thereto. The pipe 27 has a sheathing of plastic material 28 to provide a surface by which the user may grip the probe without exposure to the extreme cooling effect of the coolant passing internally through the probe. The pipe 27 is connected to a flexible hose 29 which is joined to a flow control valve 31 receiving a gaseous or liquid coolant from a storage container 32. A number of different types of coolant may be successfully used which include Freon 12 (TM) ($CCl_2F_2$), liquid $CO_2$ and liquid $N_2$. The coolant may be applied directly onto the lens, if desired, to freeze the layer of liquid used to affix the lens to carrier member. This is followed by cooling by conduction.

Prior to reducing the temperature of the lens it is important to center the lens upon the surface 23 of the probe which is accomplished by a visual inspection of the lens on the surface 23 when the probe is held in the upright position. The lens is then held in place by the use of tongs or other readily available instruments until the flow of coolant reduces the temperature of the disk 21 to render the layer of liquid effective thus firmly affixing the lens to the surface 23. It is important that throughout the machining and polishing operations, that the temperature of the lens be reduced to and maintained at, for example, at least $-90°F$ or lower, thereby materially reducing its elasticity characteristic.

During the machining and polishing operations it is essential that a liquid interface is maintained between the tooling surface of a tool and the lens surface to permit and enhance the mechanical displacement of lens material. This interface liquid must have a low freezing point, i.e. a freezing point below $-90°F$, preferably leaving essentially no residuals. A mixture of ethanol an glycerine or similar esters may be used as an interface liquid. It is greatly preferred to select the liquid interface as a mixture of oil of orange and ethyl ($C_2H_5OH$). The ethyl alcohol should be 200% proof. In this mixture the concentration of the components is preferred at 1:1 by volume of the oil of orange and ethanol. Available information suggests that the mixture does not undergo any type of chemical reaction. The liquid interface further includes, in its preferred form, one gram of stannic oxide ($S_nO$) per liter of the above mixture. A powdered form (400 mesh size or smaller) should be selected to function as a polishing agent. The stannic oxide is presently available from Fisher Scientific with the following specification:

$S_nO_2$ — White — FW150.69
As — 0.006%
Cl — 0.006%
NaOH — 0.10%
$SO_4$ — 0.006%
Sal Salts — 0.50%
Fe — 0.002%

Other suitable variations to the ratio of components of the mixture for the liquid interface are possible. For example, ethanol at 40 to 60% in relation to the volume of oil of orange. The quantity of stannic oxide added to the mixture can be varied between 1 gram to 10 grams per liter of solution. Physical agitation of liquid interface mixture should be provided to keep the stannic oxide particles in suspension with the solution.

In view of the foregoing, it is apparent that the liquid interface is a liquid that remains in a liquid state at normal atmospheric pressure and that the interface liquid constitutes a liquid having a freezing point which is essentially below the reduced temperature of the article. The interface liquid can be further characterized in a comparative manner as defining a vapor pressure at any given temperature which is essentially less than the vapor pressure of the coolant medium at the same temperature.

The machining and polishing operations will generate a certain quantity of heat which must be readily dissipated. Therefore, it is preferred to touch the lens with a tooling surface while maintaining the liquid interface therebetween. It is necessary and sufficient to touch the lens once or a number of times for very short periods, each of a duration usually not exceeding 1 second of time.

In FIG. 4, a tooling spindle 35 has a conical tooling surface 36 in the form of a rough tooling finish. The spindle 35 is supported in a socket 37 that is, in turn, rotatably supported by bearings in a support structure. The socket member 37 is connected to a suitable drive such as motor 38 to rotate the member 35 at speeds in excess of 1,000 revolutions per minute. For a machining operation the optimum speed is approximately 2,500 RPM during cutting or similar modification of the lens. For polishing operation the optimum speed is 18,000 RPM. Higher speeds can be used. As will be apparent hereinafter, the tooling member or the lens can be rotated. It is preferred, however, to rotate the lens.

After the desired machining and polishing operations have been completed, the valve 31 is used to terminate the flow of the coolant gas. As the lens and support surface 23 return to ambient temperature, the aqueous layer of liquid becomes liquid again, thus freeing the lens for removal from the probe. A stream of heated air, such as supplied by an ordinary hair dryer, may be directed onto the lens support member to speed up the return of the lens to an ambient temperature. An electric heating element may be embedded below the lens support surface of the carrier member to speed up the return of the lens to an ambient temperature.

A thermocouple may be embedded below the lens support surface and connected to a remote indicator in order to assure that the desired lowered temperature of −90°F or less has been reached before machining and polishing operations are commenced. However, it has been discovered that in lieu of actual temperature measurements, visual inspection of the lens and/or support member will reveal a white or a complete frosting appearance to their outer surface upon attaining the desired temperature.

In FIG. 6, illustrates a second embodiment of apparatus according to the present invention and a more automated form apparatus is provided for machining and polishing a contace lens. The anterior surface of a semifinished lens is supported upon the upper convex surface 40 of a cylndrical-shaped holder 41. The holder has fins 41a spaced along its cylindrical surface for very efficient heat transfer, particularly when coolant is applied thereto. It is apparent that the posterior surface of a lens can be similarly supported upon a holder having a concave lens supporting surface, not shown. A ring 42 has a central bore for receiving the holder 41. The ring 42 has a radial concave edge 43 used for centering the lens upon the surface 40. This is carried out by vertically sliding the ring 42 along the holder 41 until the surfaces 43 contact the outer edge of the lens. As this occurs, the lens being subjected to the forces of gravity and aided by the lubricating effect of the aqueous layer of liquid material previously applied thereto, will cause the lens to assume a centered position. The ring 42 is then allowed to pass downward on the holder 41 and assume an inoperative position where it is seated in a recess 44 formed in the holder 41. An arbor 45 has a central bore into which there is received the stem 46 of the holder 41. The arbor 45 is supported by bearings that are carried by a frame 47 that may be part of the headstock of a lathe which has a vertically rotational axis. The arbor 45 is coupled to a motor for rotation at the desired speed as heretofore indicated. A plunger 50 is urged by a spring 51 toward the lens in order to hold the lens in its centered position before affixing it to the surface 40 by freezing the layer of liquid therebetween. A snap ring 52 maintains the plunger slidably supported within a bore formed in a tooling member 53. The tooling member has an actual tooling surface 54 extending about 20° about the lower edge of the member 53. The surface 54 is shaped for machining and polishing the desired surfaces of the lens illustrated in FIG. 2. The tool member 53 may be supported in the tailstock of the lathe or, if desired, it may be rotated at some preselected speed such that the relative speed between the tooling surface 54 and the lens when supported on the surface 40 falls within the range of speeds as heretofore indicated.

A source of liquefied coolant, such as that illustrated and described in FIG. 4, may be used to direct a stream of coolant directly to the lens to affix it onto the surface 40. A stream of coolant should be directed onto the fins 41a to maintain, if not entirely cool the lens by conductive heat transfer. After the lens has been supported and centered on the surface 40, the tool member 53 is lowered so that the plunger head 50 is brought into holding contact with the lens upon the surface 40 until cooling to a desired temperature has been achieved and maintained. The tool member 53 is then advanced further so that the tooling surface 54 contacts the lens to produce the desired machining and/or polishing operations.

Figure 7:
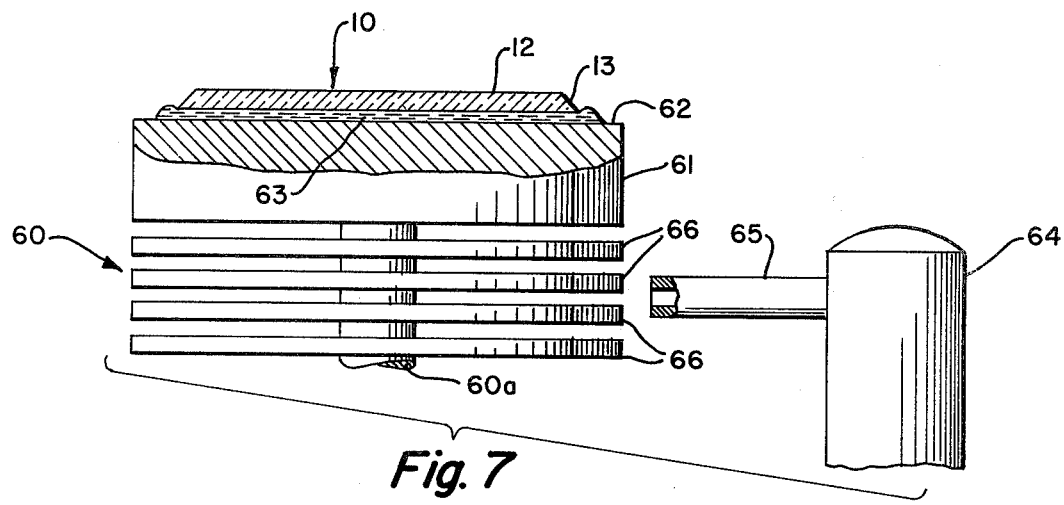
FIG. 7 is an elevational view partly in cross-section of apparatus according to a third embodiment of the present invention.

FIG. 7 illustrates the preferred form of a driven lens carrier member 60 employed for the modification of the anterior surface of a lens. A suitable drive, not shown, is provided to rotate the carrier member at the same speeds as previously described in regard to the tooling spindle of FIG. 4. The carrier member 60 includes a drive shaft 60a at its lower end and at its upper end a disk portion 61 defines a flat lens support surface 62 which is highly polished. A layer of liquid 63, e.g., water, is established upon the lens support surface 62. A semifinished lens 10 or the lens 16 is placed upon the layer of liquid 63 such that the peripheral anterior curve area 12 of the lens is exposed. An elastic deforming pressure is applied centrally to the lens in the direction toward the carrier member 60. This pressure is exerted on the lens in such a way to expell all entrapped air which can be determined and confirmed visually because the lens is transparent. The applied pressure on the lens serves the added function of elastically deforming the lens into a flat disk-like configuration as compared with the molded shape shown by FIGS. 2 and 3. The lens is then centered on the support surface 62.

A handle 64 is used to position the discharge end of a nozzle 65 at a space of about 2 mm from a plurality of spaced-apart heat transfer fins 66 below the disk portion 61. The fins are part of the carrier member 60 which is made from material with good heat conduction properties such as copper or aluminum. A gaseous or liquid coolant is conducted by a nozzle onto the heat transfer fins to cool a lens located upon the carrier member by conductive heat transfer down to at least −90°F. This cooling freezes the layer of liquid 63 and thereby affixes the lens to the support surface 62. The cooling is also essential to minimizing the elastic properties of the lens material. This renders the material at a temporary state of increased hardness which is conductive to modifying the lens surface by machining and/or polishing. During such modification, it has been found essential to maintain a liquid interface between the surface of the lens and a tooling surface. By selecting a flat tool to provide the tooling surface, one can minimize the number of tools required for differennt diameter lenses. The foregoing arrangement of parts has been found to eliminate an air foil effect on the lens when rotated.

Figure 8:
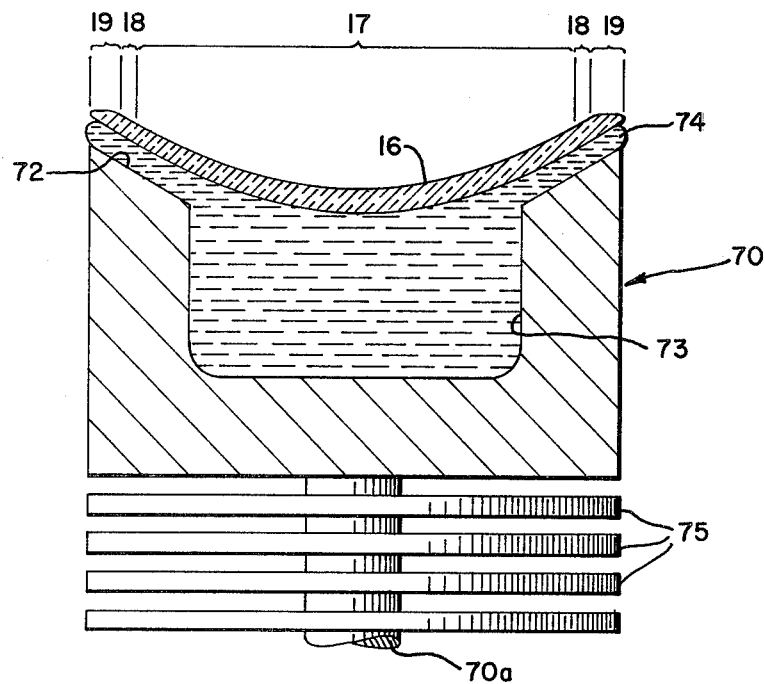
FIG. 8 is an elevational view in section of a fourth embodiment of apparatus according to the present invention.

FIG. 8 illustrates a preferred form of driven lens carrier member 70 employed for the modification of the posterior surface of a lens. A suitable drive, not shown, is provided to rotate the carrier member at the speeds previously described in regard to the tooling spindle of FIG. 4. The carrier member 70 includes a drive shaft 70a at its lower end. A cup-shaped aqueous cell 71 is employed to support a lens at the upper end of the member 70. The cell is cylindrically-shaped and has a chamfered or beveled lens support surface 72. A hollowed internal pocket 73 forms a resevoir for a layer of liquid 74 between the surface 72 and the lens 12 or 16. In FIG. 8, the lens 16 is supported by the liquid to expose the surfaces 17, 18 and 19. To support a lens in this manner, an excessive quantity of liquid (i.e. water) is placed in the pocket 73 and then the lens is placed upon the liquid. The lens is buoyant and supported by the layer of liquid which acts as a cushion. As a result automatic self-centering and leveling of the lens will take place. A plurality of spaced-apart heat transfer fins 75 are used and constructed in the same manner as described in regard to FIG. 7. However, in FIG. 8 the lens is affixed to the aqueous cell by the freezing of the liquid layer 74 including the liquid in the pocket 73. This cooling is also essential to rendering the lens material at a temporary state of increased hardness as previously described.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A method of machining and/or polishing an article, such as a contact lens or the like, of a molded elastomer to modify a surface of the article, said method including the steps of:
    positioning said article upon the support surface of a carrier member;
    reducing the temperature of said article in such a way so as to essentially increase the hardness of the molded elastomer forming said article;
    establishing a liquid interface between a tooling surface and a selected surface of said article to undergo modification in such a manner so as to include forming a wetted liquid surface upon the article after the hardness thereof has been essentially increased by said reducing the temperature; the liquid interface being in a liquid state at normal atmospheric pressure and constituting a liquid having a freezing point below the reduced temperature of the article;
    modifying the selected surface of said article by the contact with a tooling surface while the selected surface remains wet with and in the presence of said liquid interface while maintaining said molded elastomer at a state of increased hardness by the continued reduced temperature thereof; and
    allowing the temperature of said article to return to an ambient room temperature.

2. The method according to claim 1 wherein the established liquid interface has a vapor pressure at any given temperature which is essentially less than the vapor pressure of the coolant medium at the same temperature.

3. The product formed by the method of claim 1.

4. The method according to claim 1 including the further step of:
    producing relative rotation between said article and said tooling surface after said reducing the temperature of said article.

5. The method according to claim 1 including the further steps of:
    establishing a layer of liquid between a surface of said article and said support surface of a carrier member, the liquid forming said layer being such that it remains essentially in a fluid state at an ambient room temperature; and thereafter
    locating said article into a desired position during said positioning said article upon the support surface of a carrier member,
    said reducing the temperature of said article being further essential to the freezing of said layer of liquid to thereby affix said article onto said carrier member.

6. The method according to claim 1 wherein said reducing the temperature of said article is further defined to include the step of:
    directing a stream of coolant essentially onto said carrier member to reduce the temperature of said article by conductive heat transfer while the article is supported by the carrier member.

7. The method according to claim 5 wherein following said reducing the temperature of said article, said method includes the further steps of:
    rotating said carrier member with said article affixed thereto, and concurrently therewith,
    directing a stream of coolant essentially onto said carrier member to maintain the reduced temperature of said article by conductive heat transfer as an incident to said modifying the selected surface of said article.

8. The product formed by the method of claim 7.

9. The method according to claim 7 wherein said directing a stream of coolant is further defined to include maintaining said article at a reduced temperature of at least −90°F.

10. The method according to claim 9 wherein said rotating said carrier member with said article affixed thereto is further defined to include rotating said carrier member at a speed in excess of 1,000 RPM.

11. The method according to claim 10 wherein said article is further defined as a semifinished contact lens of a molded elastomer including a silica filler.

12. The method according to claim 5 wherein following said step of reducing the temperature of said article, said method includes the further steps of:
   rotating a tooling member defining said tooling surface at a speed greater than 1,000 RPM,
   directing a stream of coolant essentially onto said carrier member to maintain the reduced temperature of said article by conductive cooling as an incident to modifying the selected surface of said article while maintaining said liquid interface between the selected surface and said tooling surface.

13. The product formed by the method of claim 12.

14. The method according to claim 12 wherein said article is further defined as a semifinished contact lens of a molded elastomer including a silica filler.

15. The product formed by the method of claim 14.

16. The method according to claim 5 wherein said layer of liquid established between a surface of said article and the support surface of a carrier member is further defined to include using water to establish said layer of liquid.

17. The method according to claim 7 wherein said article is defined as a contact lens and wherein said step of locating said article into a desired position is further defined to include centering said contact lens upon a contoured surface of the carrier member.

18. The method according to claim 1 for modifying a contact lens wherein said method additionally includes the initial steps of:
   establishing a layer of liquid between a surface of said contact lens and a flat support surface of a carrier member, the liquid forming said layer having a freezing point essentially above a subsequently reduced temperature of the lens; and thereafter,
   applying pressure on said contact lens in a direction toward said flat support surface to elastically flatten said lens, said reducing the temperature of said article being further essential to freezing said layer of liquid to thereby affix said lens while elastically flattened onto said carrier member.

19. The method according to claim 18 wherein said applying pressure on said contact lens is carried out in such a way so as to expel entrapped air between the lens and the support surface.

20. The product formed by the method of claim 19.

21. The method according to claim 1 for modifying a contact lens wherein said method additionally includes the initial steps of:
   filling a hollowed area in a carrier member with a liquid having a freezing point essentially above a subsequently lowered temperature of the lens, and thereafter,
   locating said contact lens to float upon said liquid and thereby establish a layer of liquid between said lens and a lens support surface of said carrier member, said reducing the temperature of said article being further essential to freezing said layer of liquid to thereby affix said lens onto said carrier member.

22. The product formed by the method of claim 21.

23. The method according to claim 1 wherein the liquid interface includes ethyl alcohol.

24. The product formed by the method of claim 23.

25. The method according to claim 23 wherein said liquid interface is a mixture of one part by volume of oil of orange and one part by volume of ethyl alcohol.

26. The method according to claim 1 wherein said liquid interface is established by using a liquid suspension of stannic oxide.

27. The method according to claim 23 wherein said mixture for the liquid interface further includes stannic oxide.

28. The method according to claim 27 wherein said stannic oxide has a particle size of 400 mesh size or smaller.

29. The method according to claim 28 wherein between one to ten grams of stannic oxide are added to each liter of liquid mixture of oil of orange and ethyl alcohol.

30. The product formed by the method of claim 29.

31. The method according to claim 1 wherein the temperature of said article is elevated to an ambient room temperature following said step of modifying the selected surface thereof by directing a stream of heated air onto said article.

32. The method according to claim 6 wherein the temperature of said article is returned to an ambient room temperature following said step of modifying the selected surface thereof by directing a stream of heated air onto said carrier member for conductively heating the article to an ambient room temperature.

33. A method of machining and/or polishing an article, such as a contact lens or the like, of a molded elastomer to modify a surface of the article, said method including the steps of:
   establishing a layer of liquid between a surface of said article and a support surface of a carrier member, the liquid forming said layer having a freezing point at a temperature essentially above a subsequently reduced temperature of said article; and thereafter
   locating said article into a desired position upon the support surface of the carrier member;
   reducing the temperature of said article to essentially freeze said layer of liquid to thereby affix said article onto said carrier member, said reducing the temperature of said article being further essential to increasing the hardness of the molded elastomer forming said article;
   rotating the carrier member while said article is affixed thereto;
   modifying the selected surface of said article by the contact with a tooling surface while maintaining said molded elastomer at a state of increased hardness by said reducing the temperature thereof; and thereafter,
   allowing the temperature of said article to return to an ambient room temperature.

34. The product formed by the method of claim 33.

35. The method according to claim 33 wherein said layer of liquid established between a surface of said article and the support surface of a carrier member is further defined to include using water to establish said layer of liquid.

36. The method according to claim 33 wherein said article is defined as a contact lens and wherein said step of reducing the temperature of said article includes directing a stream of coolant onto said carrier member to conductively cool the contact lens.

37. The method according to claim 33 for modifying a contact lens wherein said layer of liquid is established upon a flat lens support surface, said method additionally includes the steps of:

arranging said lens upon the established layer of liquid, and thereafter applying pressure on said contact lens in a direction toward said flat support surface to elastically flatten said lens as an essential incident to freezing said layer of liquid to thereby affix said lens while elastically flattened onto said carrier member.

38. The product formed by the method of claim 37.

39. The method according to claim 37 wherein said applying pressure on said contact lens is carried out in such a way so as to expel entrapped air between the lens and the support surface.

40. The method according to claim 33 for modifying a contact lens wherein said method additionally includes the initial steps of:

filling a hollowed area in a carrier member with a liquid to form said layer of liquid, and thereafter, locating said contact lens to float upon said liquid to thereby establish a layer of liquid between said lens and a lens support surface of said carrier member, and thereafter centering said contact lens by buoyant floating upon the layer of liquid, said reducing the temperature of said article being further essential to freezing said layer of liquid to thereby affix said lens onto said carrier member.

41. The product formed by the method of claim 40.

42. An apparatus for machining and/or polishing a molded elastomer article, said apparatus comprising:

carrier means including a face surface for supporting said article in a manner to expose a surface thereof during modification, said carrier means further including a heat exchange surface remote to said face surface to essentially reduce the temperature of said article while supported by said carrier means through the agency of conductive heat transfer;

said carrier means further includes a layer of liquid on said face surface for affixing said contact lens thereto upon freezing thereof;

means to direct a cooling medium onto said heat exchange surface for hardening said article by reducing the temperature thereof;

tooling means including a liquid interface for modifying the exposed surface of said article; and means for producing relative rotation between said tooling means and said article while supported by said carrier means.

43. The apparatus according to claim 42 wherein said carrier means further includes an elongated tubular support member having openings in the wall thereof for conducting said coolant medium from within said tubular support member onto said heat exchange surface.

44. The apparatus according to claim 42 further comprising a centering ring including a contoured surface for displacement into engagement with said contact lens to center the lens relative to said carrier means.

45. The apparatus according to claim 42 further comprising:

a plunger having a surface at one end for contact with said article when supported by said carrier means, resilient means for urging said plunger into holding contact with said article, and means for supporting said plunger relative to said carrier means.

46. The apparatus according to claim 42 wherein said liquid interface is further defined as a mixture of oil of orange and ethyl alcohol.

47. The apparatus according to claim 42 wherein said liquid interface includes ethyl alcohol at 200 proof.

48. The apparatus according to claim 42 wherein said liquid interface is further defined to include a liquid suspension of stannic oxide having a particle with a mesh size of 400 or smaller.

49. The apparatus according to claim 42 wherein said article is a contact lens and wherein said carrier means is further defined to include a flat surface for supporting said contact lens in an elastically flattened state.

50. The apparatus according to claim 42 wherein said carrier means is further defined to include a tubular wall with an inclined lens support surface at the upper end thereof, said tubular wall defining the sides of pocket, a floor wall in said carrier means lying below said lens support surface for supporting a volume of liquid in said pocket.

51. The apparatus according to claim 42 wherein said carrier means is further defined to include a cup-shaped liquid container having a tubular wall defining a lens support surface at the upper end thereof.

* * * * *